(12) United States Patent
Bae

(10) Patent No.: US 10,577,741 B2
(45) Date of Patent: Mar. 3, 2020

(54) WASHING AND DRYING SYSTEM

(71) Applicant: LG Electronics Inc., Seoul (KR)

(72) Inventor: Suncheol Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 198 days.

(21) Appl. No.: 15/547,396

(22) PCT Filed: Jan. 30, 2016

(86) PCT No.: PCT/KR2016/001048
§ 371 (c)(1),
(2) Date: Jul. 28, 2017

(87) PCT Pub. No.: WO2016/122275
PCT Pub. Date: Aug. 4, 2016

(65) Prior Publication Data
US 2018/0023243 A1 Jan. 25, 2018

(30) Foreign Application Priority Data
Jan. 30, 2015 (KR) .......................... 10-2015-0015242

(51) Int. Cl.
*F26B 19/00* (2006.01)
*D06F 58/28* (2006.01)
(Continued)

(52) U.S. Cl.
CPC .............. *D06F 58/28* (2013.01); *D06F 25/00* (2013.01); *D06F 29/005* (2013.01); *D06F 33/02* (2013.01);
(Continued)

(58) Field of Classification Search
CPC .......... D06F 58/00; D06F 58/02; D06F 58/04; D06F 58/08; D06F 58/206; D06F 58/28;
(Continued)

(56) References Cited

U.S. PATENT DOCUMENTS

2004/0118008 A1* 6/2004 Jeong ..................... D06F 58/28
34/425
2010/0269266 A1 10/2010 Lee et al.
(Continued)

FOREIGN PATENT DOCUMENTS

EP 1882768 1/2008
JP 2017-121395 7/2017
(Continued)

OTHER PUBLICATIONS

International Search Report in International Application No. PCT/KR2016/001048, dated Jun. 20, 2016, 3 pages (with English translation).
(Continued)

*Primary Examiner* — John P Mccormack
(74) *Attorney, Agent, or Firm* — Fish & Richardson P.C.

(57) ABSTRACT

A washing and drying system is disclosed. The system includes a washing machine that has a washing function. The system further includes a dryer that has a drying function. The dryer includes a drying unit that is configured to increase a temperature within a drying chamber that is configured to receive clothing. The dryer further includes a controller that is configured to set a capacity of the drying unit according to an operation termination time of the washing machine based on operation of the washing machine, and operate the drying unit according to the set capacity.

20 Claims, 6 Drawing Sheets

(51) Int. Cl.
*D06F 33/02* (2006.01)
*D06F 29/00* (2006.01)
*D06F 25/00* (2006.01)
*D06F 39/00* (2020.01)
*D06F 39/08* (2006.01)
*D06F 58/20* (2006.01)
*D06F 58/02* (2006.01)

(52) U.S. Cl.
CPC .......... *D06F 39/005* (2013.01); *D06F 39/008* (2013.01); *D06F 39/083* (2013.01); *D06F 39/088* (2013.01); *D06F 58/206* (2013.01); *D06F 58/02* (2013.01); *D06F 2058/2803* (2013.01); *D06F 2058/287* (2013.01); *D06F 2058/289* (2013.01); *D06F 2058/2816* (2013.01); *D06F 2058/2861* (2013.01); *D06F 2058/2883* (2013.01); *D06F 2058/2896* (2013.01); *D06F 2210/00* (2013.01); *D06F 2220/00* (2013.01)

(58) Field of Classification Search
CPC ............. D06F 58/2803; D06F 58/2806; D06F 58/2809; D06F 58/281
USPC .................................... 34/549, 524, 551, 553
See application file for complete search history.

(56) References Cited

U.S. PATENT DOCUMENTS

| | | | |
|---|---|---|---|
| 2011/0041564 A1* | 2/2011 | Beihoff | D06F 29/005 68/13 R |
| 2011/0162228 A1* | 7/2011 | Park | D06F 58/20 34/427 |
| 2013/0167398 A1 | 7/2013 | Lee et al. | |

FOREIGN PATENT DOCUMENTS

| | | |
|---|---|---|
| KR | 10-2005-0066534 | 6/2005 |
| KR | 10-2007-0015291 | 2/2007 |
| KR | 10-2010-0118227 | 11/2010 |
| KR | 10-2013-0078818 | 7/2013 |
| KR | 10-2013-0101914 | 9/2013 |
| WO | 2010/128727 | 11/2010 |
| WO | 2017/131395 | 8/2017 |

OTHER PUBLICATIONS

Extended European Search Report in European Application No. 16743753.2, dated Oct. 1, 2018, 8 pages.

* cited by examiner

[Fig. 1]
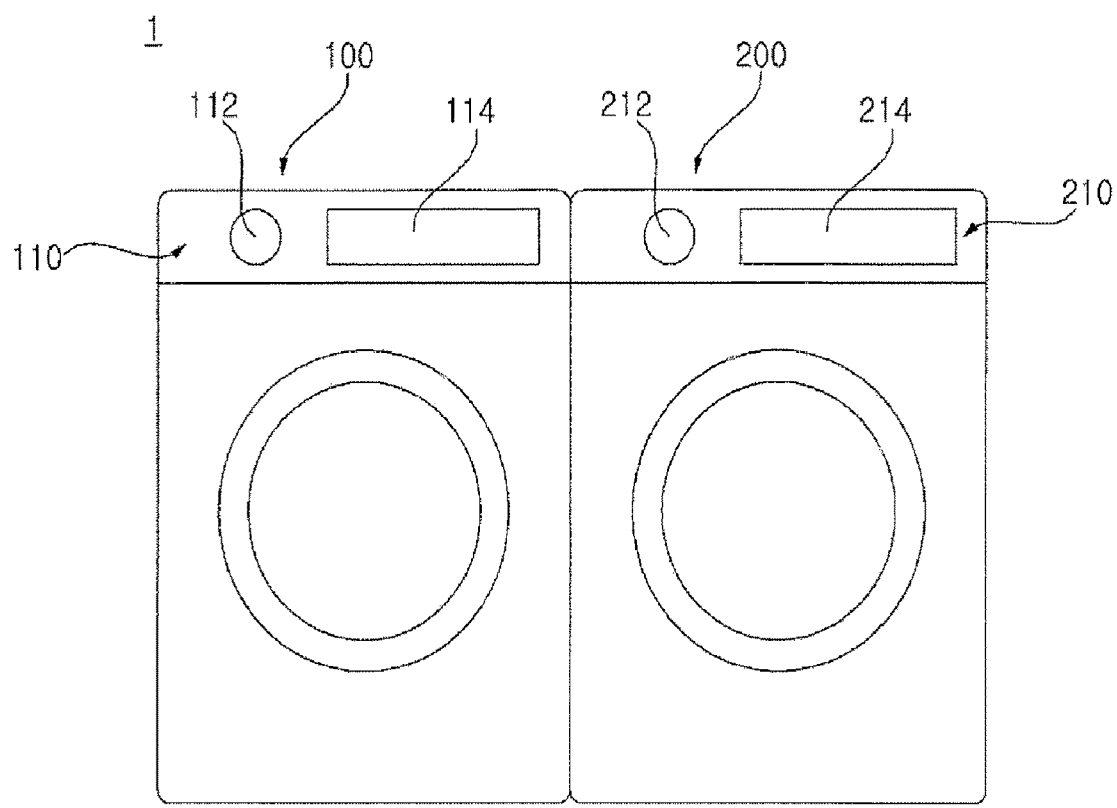

[Fig. 2]
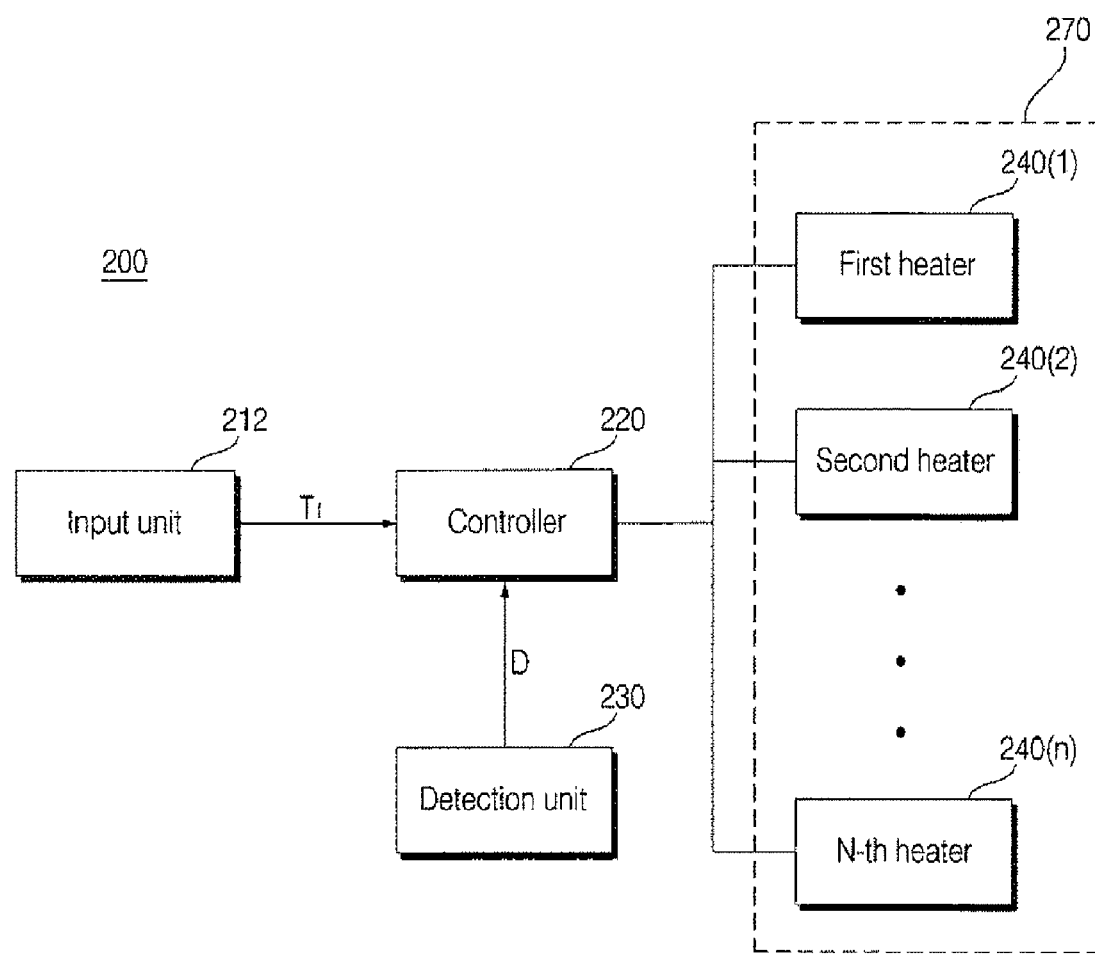

[Fig. 3]
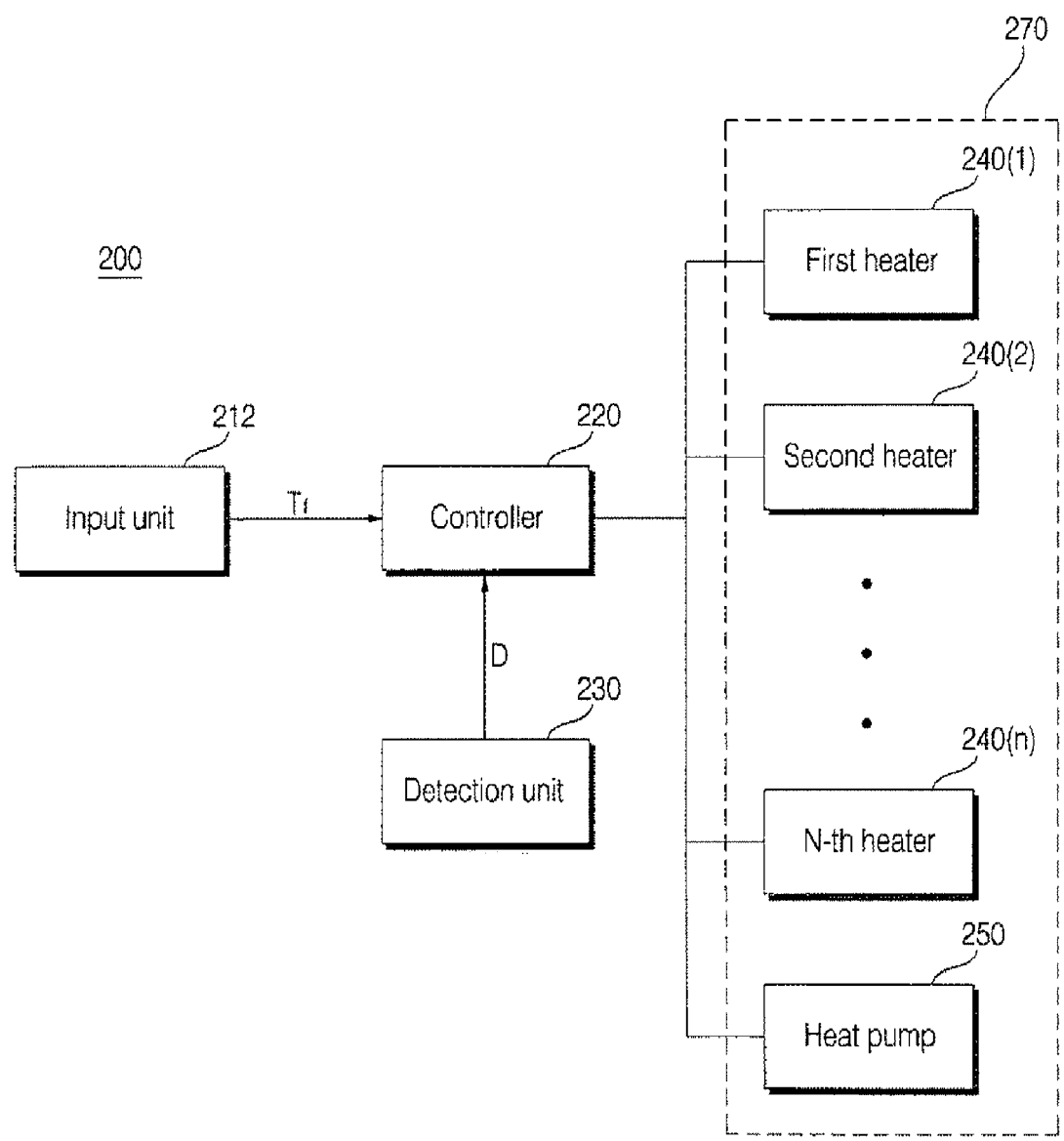

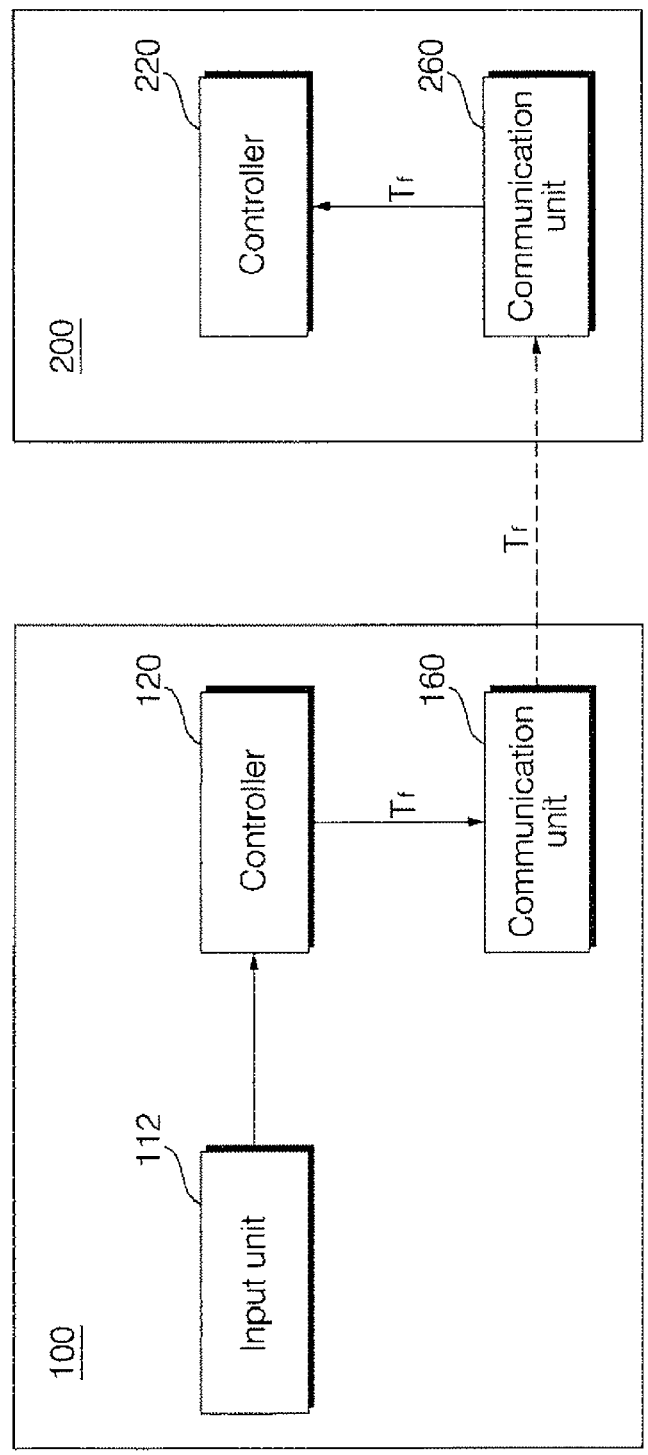
[Fig. 4]

[Fig. 5]
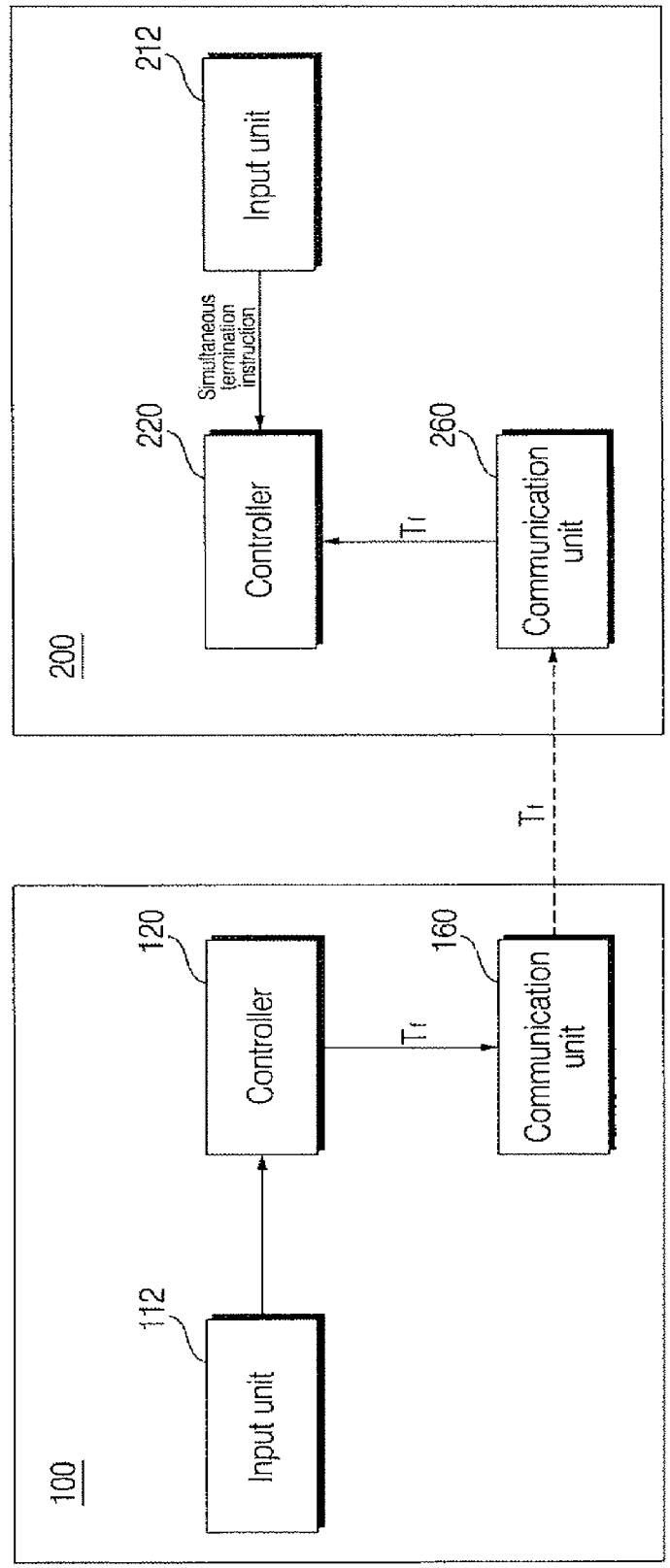

[Fig. 6]
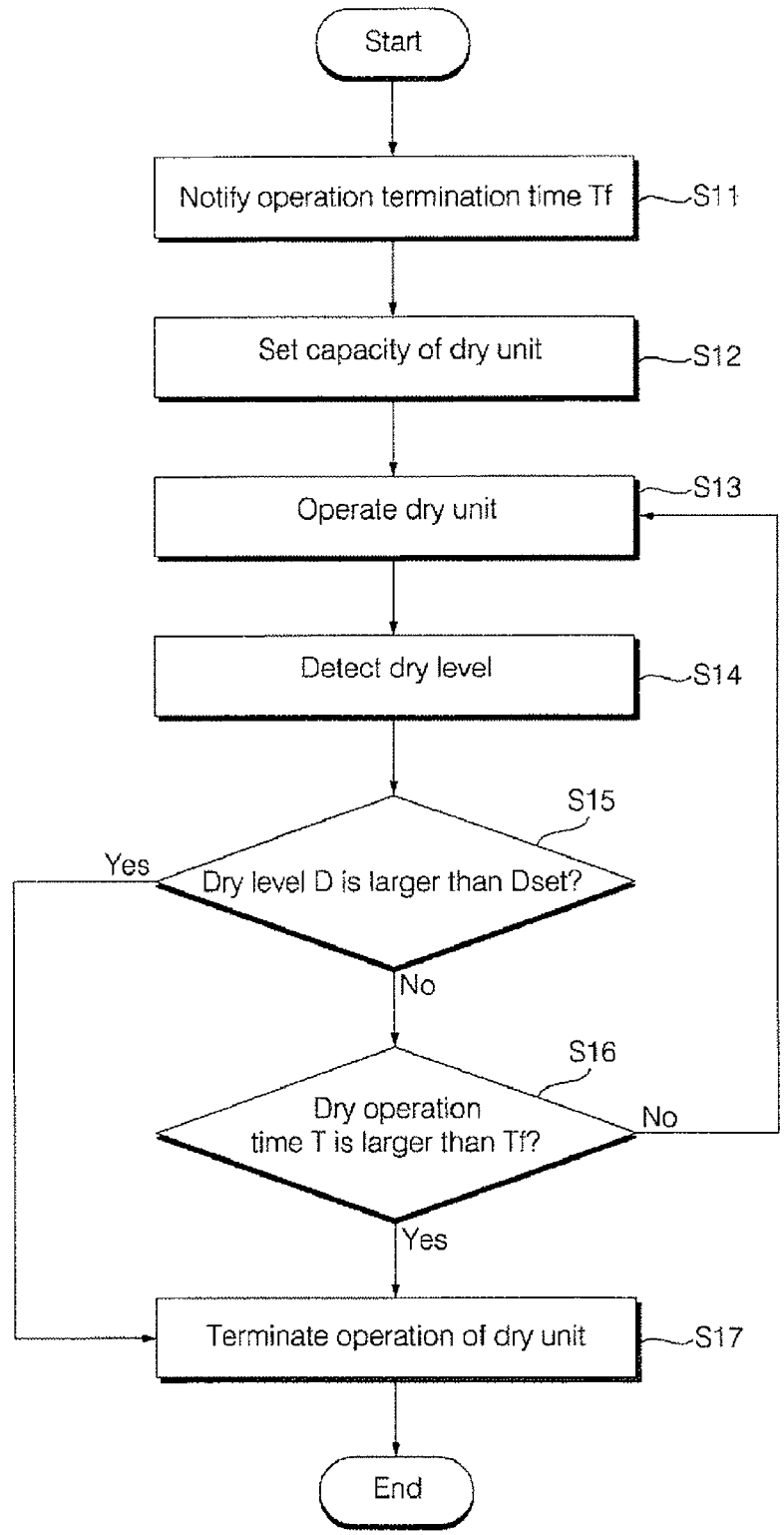

WASHING AND DRYING SYSTEM

CROSS-REFERENCE TO RELATED APPLICATIONS

This application is a National Stage application under 35 U.S.C. § 371 of International Application No. PCT/KR2016/001048, filed Jan. 30, 2016, which claims the benefit of Korean Application No. 10-2015-0015242, filed on Jan. 30, 2015. The disclosures of the prior applications are incorporated herein by reference in their entirety.

TECHNICAL FIELD

The present disclosure relates to a washing and drying system.

BACKGROUND ART

In general, a laundry processing device processes laundry through several operations such as washing, dehydration, and/or dry. Such a laundry processing device includes a washing machine that washes laundry such as clothing or bedding using an emulsification operation of detergent, a water flow operation occurring by a rotation of a washing tank or a washing blade, and a mechanical force in which the washing blade applies, a dryer that dries the laundry by applying hot wind or cold wind, and a refresher that smoothes a crease of clothing by applying steam and further includes a device that complexly provides several functions such as a dryer combined washing machine.

DISCLOSURE OF INVENTION

Technical Problem

According to an innovative aspect of the subject matter described in this application a washing and drying system includes a washing machine that has a washing function; and a dryer that has a drying function and that includes a drying unit that is configured to increase a temperature within a drying chamber that is configured to receive clothing; and a controller that is configured to set a capacity of the drying unit according to an operation termination time of the washing machine based on operation of the washing machine, and operate the drying unit according to the set capacity.

Solution to Problem

The washing and drying machine may include one or more of the following optional features. The controller is configured to set the capacity of the drying unit set to a value that is inversely related to the operation termination time of the washing machine. The drying unit includes a plurality of heaters. The controller is further configured to set a number of the plurality of heaters to operate according to the operation termination time, and operate the number of the plurality of heaters. The dryer further includes a recording medium that is configured to store the number of the plurality of heaters to operate, each number of the plurality of heaters corresponding to a respective range of operation termination times. The action of setting the number of the plurality of heaters to operate includes identifying the respective range of operation termination times to which the operation termination time belongs. The drying unit includes a heat pump that is configured to increase a temperature within the drying chamber. The controller is further configured to set a capacity of the heat pump according to the operation termination time.

The dryer further includes an input unit that is configured to receive, from a user, an input of the operation termination time. The washing machine includes a first communication unit that is configured to transmit, to a wired or wireless network, the operation termination time. The dryer further includes a second communication unit that is configured to receive, through the wired or wireless network, the operation termination time. The controller is configured to set a number of heaters to operate according to the operation termination time. The drying unit is further configured to detect an amount of clothing received. The controller is configured to determine a number of heaters to operate based on the amount of clothing received. The dryer further includes a detection unit that is configured to detect a drying rate of the clothing. The detection unit reduces a number of heaters operating based on the drying rate satisfying a threshold rate. The dryer further includes a detection unit that is configured to detect a drying rate of the clothing. The detection unit increases a number of heaters operating based on the drying rate not satisfying a threshold rate.

According to another innovative aspect of the subject matter described in this application a method of controlling a laundry processing system including a washing machine that has a washing function, and a dryer that has a drying function and that is configured to receive clothing includes the actions of providing, by the washing machine and to the dryer, an operation termination time of the washing machine; based on the operation termination time, setting a capacity of a drying unit that is configured to increase a temperature within a drying chamber of the dryer; and operating the drying unit according to the set capacity.

The method of controlling a laundry processing system may include one or more of the following optional features. The action of setting the capacity of the drying unit includes setting the capacity of the drying unit to a value that is inversely related to the operations termination time of the washing machine. The drying unit includes a plurality of heaters. The action of setting a capacity of a drying unit includes setting a number of the plurality of heaters to operate according to the operation termination time. The action of operating of the drying unit includes operating the number of the plurality of heaters. The actions further include storing the number of the plurality of heaters to operate, each number of the plurality of heaters corresponding to a respective range of operation termination times. The action of setting the number of the plurality of heaters to operate includes identifying the respective range of operation termination times to which the operation termination time belongs. The drying unit further includes a heat pump that is configured to increase a temperature within the drying chamber.

The action of setting a capacity of the drying unit includes setting a capacity of the heat pump according to the operation termination time. The action of providing an operation termination time of the washing machine includes receiving, from a user through an input unit located in the dryer the operation termination time. The action of providing an operation termination time of the washing machine includes transmitting, by the washing machine and through a wired or wireless network, the operation termination time; and receiving, by the dryer and through the wired or wireless network, the operation termination time. The actions further include detecting an amount of clothing received; and operating a number of heaters based on the amount of clothing received. The actions further include detecting a drying rate of the clothing; and reducing a number of heaters operating based on the drying rate satisfying a threshold rate. The actions further include detecting a drying rate of the clothing; and increasing a number of heaters operating based on the drying rate not satisfying a threshold rate.

Advantageous Effects Of Invention

The present disclosure describes a washing and drying system and a method of controlling the same in which an operation termination time point of a dryer is set according to an operation termination time point of a washing machine, when simultaneously operating the washing machine and the dryer.

In a washing and drying system and a method of controlling the same, because a dryer and a washing machine can be simultaneously terminated, when the washing machine and the dryer are together operated, user convenience is improved.

Further, even if the dryer and the washing machine are together terminated, a non-dry or excessive dry phenomenon of clothing can be prevented from occurring.

Further, by adjusting a capacity of the dry unit of the dryer according to a termination time of the washing machine, a dry level of clothing and power consumption can be optimized.

BRIEF DESCRIPTION OF DRAWINGS

FIG. 1 is a diagram of an example washing and drying system.

FIGS. 2 and 3 are a block diagrams of example configurations of example dryers.

FIGS. 4 and 5 are a block diagrams of example configurations of example washing and drying systems.

FIG. 6 is a flowchart of an example method of controlling a washing and drying system.

MODE FOR THE INVENTION

FIG. 1 illustrates an example washing and drying system.

Referring to FIG. 1, a washing and drying system 1 includes a washing machine 100 having a washing function of laundry and a dryer 200 having a dry function of laundry.

The washing machine 100 may include a water tank that stores water, a washing tank that houses laundry and rotatably provided within the water tank, a motor that rotates the washing tank, a water supply device that supplies water into the water tank or the washing tank, and a drainage device that discharges water within the water tank. However, the washing machine 100 may perform functions in addition to washing and may be, for example, a dryer combined washing machine that together provides a washing function and a dry function. Further, nowadays, a laundry processing device (e.g., a refresher) that removes contaminants of clothing by ejecting steam to the clothing disposed within a fixed space is used without a washing tank, and such a device also corresponds to the washing machine 100.

In such a washing machine 100, various elements such as a water tank, a washing tank, and a motor are disposed within a casing (or a main body) that forms an external appearance, and in the casing, a control panel 110 that provides an input unit 112 that receives an input of various setting for an operation control of the washing machine 100 from a user and a display unit 114 that displays an operation state of the washing machine 100 is provided.

The dryer 200 may include a drum that houses wet clothing, a motor that rotates the drum, and an air blowing device that sends hot wind or cold wind into the drum. Such elements are provided in a general washing machine and become more readily apparent to those skilled in the art and therefore a detailed description thereof will be omitted. However, the dryer 200 may perform functions in addition to drying and may be a dryer combined washing machine, and a laundry processing device such as a refresher that dries clothing by sending hot wind or cold wind to the clothing disposed within a fixed space without a drum also corresponds to the dryer 200.

In such a dryer 200, various elements such as a drum and a motor are disposed within a casing (or a main body) that forms an external appearance, and in the casing, a control panel 210 that provides an input unit 212 that receives an input of various setting for an operation control of the dryer 200 from the user and a display unit 214 that displays an operation state of the dryer 200 is provided.

In a home, the washing machine 100 and the dryer 200 are generally provided in a washing room separate from a living space in which the user generally activates, and the washing machine 100 and the dryer 200 may be normally installed at one location or may be respectively installed at separated rooms according to a situation. Hereinafter, it is defined that the washing and drying system 1 includes the washing machine 100 and the dryer 200 spatially located within a predetermined range. In some implementations, the washing machine 100 and the dryer 200 each are disposed at separated rooms within a constant range of a user residence.

FIG. 2 illustrates an example configuration of a dryer 200. FIG. 3 illustrates an example configuration of a dryer. Hereinafter, to distinguish elements provided in the washing machine 100 and the dryer 200, 'first' is given in front of a name of elements provided in the washing machine 100, and 'second' is given in front of a name of elements provided in the dryer 200.

The dryer 200 includes a dry unit 270 that increases a temperature within a dry chamber into which clothing is injected and a controller 220 that sets a capacity of the dry unit 270 according to an operation termination time Tf of the washing machine while the washing machine 100 operates, and that operates the dry unit 270 according to a preset capacity.

The operation termination time Tf is a time consumed until operation of the washing machine 100 is terminated and may be calculated by the first controller 120 according to setting input through the first input unit 112 or may be a time in which the user directly inputs through the first input unit 112.

When the operation termination time Tf decreases, the second controller 220 sets the dry unit 270 to operate with a larger capacity. When the operation termination time Tf decreases, in order to more quickly dry clothing, by increasing a capacity of the dryer 200, when the washing machine 100 and the dryer 200 are simultaneously terminated with a lapse of the operation termination time Tf, a phenomenon in which clothing is not dried can be prevented from occurring.

In contrast, when the operation termination time Tf increases, the second controller 220 sets the dry unit 270 to operate with a smaller capacity, and when the washing machine 100 and the dryer 200 are simultaneously terminated with a lapse of the operation termination time Tf, a phenomenon in which clothing is excessively dried can be prevented from occurring.

The dry unit 270 may include a plurality of heaters 240 that increase a temperature within a dry chamber (e.g., drum) into which clothing is injected. In some implementations, the second controller 220 may set the number of heaters to operate among a plurality of heaters according to the operation termination time Tf of the washing machine 100 and operate the preset number of heaters.

In some implementations, the dry unit 270 may include a heat pump 250 having a refrigerant circulation cycle instead of the heater 240 or may together include a heater 240 and a heat pump 250 (see FIG. 3). In some implementations, the second controller 220 may set a capacity of the heat pump 250 according to the operation termination time Tf and operate the heat pump 250 according to a preset capacity.

The heat pump 250 may include a compressor that circulates refrigerant through a closed flow channel, and a capacity of the heat pump 250 may be determined according to a driving frequency of the compressor. Hereinafter, it is described that the dry unit 270 includes at least one of the heater 240 or the heat pump 250. In some implementations, the dry unit 270 includes an exothermic unit using a Peltier element and an exothermic unit using a gas.

When a processing of laundry injected into the washing machine 100 is complete, a user takes out the laundry from the washing machine 100 and moves the laundry to the dryer 200, injects again other laundry into the washing machine 100, inputs various setting through the first input unit 112, and operates the washing machine 100. A remaining time until operation of the washing machine 100 is terminated may be displayed through the first display unit 114. In some implementations, a remaining time displayed in the first display unit 114 may be an operation termination time Tf, the user checked the operation termination time Tf may input the operation termination time Tf through the second input unit 212 provided in the dryer 200. The second controller 220 sets the number of heaters 240 to be operated while operating the dryer 200 according to the operation termination time Tf input in this way. That is, the number of heaters 240 to be operated may be changed according to the operation termination time Tf. Table 1 illustrates the number of heaters 240 and a capacity of the heat pump 250 operating according to the operation termination time Tf when the n number of heaters 240(1) to 240(n) and the heat pump 250 are provided in the dryer 200 (see FIG. 3).

TABLE 1

| | | Capacity of dry unit | |
|---|---|---|---|
| Segment | Operation termination time Tf | The number of operation heater | Capacity of heat pump (an-1 > an, n = 1, 2, 3 . . .) |
| 1 | T0 ≤ Tf < T1 | n | 100% |
| 2 | T2 ≤ Tf < T3 | n-1 | a1% |
| 3 | T3 ≤ Tf < T4 | n-2 | a2% |
| . . | . . . | . . . | . . . |
| n | Tn ≤ Tf < Tn + 1 | 1 | 10% |

As shown in Table 1, because the number of operating heaters is previously determined according to a segment to which the operation termination time Tf belongs, the number of heaters may be stored at a recording medium such as a memory, and the second controller 220 may control to operate heaters of the number corresponding to a segment to which the operation termination time Tf input through the second input unit 212 belongs.

It can be seen that the number of the heaters 240 operating while the dryer 200 operates reduces, as the operation termination time Tf increases, and when an operation time of the dryer 200 is long, laundry may be dried for an enough time and thus the laundry may be fully dried even with a small number of heaters. That is, when an operation time of the dryer 200 is long, by reducing the number of operating heaters, clothing is prevented from being excessively dried, and in contrast, when the dryer 200 is operated, by increasing the number of operating heaters, clothing may be fully dried.

Further, as shown in Table 1, the second controller 220 may control to set a capacity of the heat pump 250 according to the operation termination time Tf and to operate the heat pump 250 according to a preset capacity while the dryer 200 operates.

A user may select an amount of clothing injected into the dryer 200 through the second input unit 212, and in some implementations, the number of heaters corresponding to each segment may be increased or decreased according to the selected clothing amount. For example, when an amount of clothing selected through the second input unit 212 is a large amount, if it is assumed that the operation number of heaters according to division of Table 1 is applied, when an amount of clothing selected through the second input unit 212 is a small amount, the smaller number of heaters may be changed to be set to the same segment, compared with a large amount of clothing (e.g., a heater operating at a second segment is set to n−2). In some implementations, an amount of clothing may be automatically detected, and the second controller 220 may increase or decrease the number of operation heaters corresponding to each segment according to the detected clothing amount.

The dryer 200 may include a detection unit 230 that detects a dry level D of clothing. In some implementations, the second input unit 212 may include an input unit that receives an input of a dry level Dset in which the user requests. For example, as shown in Table 2, the number of heaters 240 to be operated according to the operation termination time Tf and a dry level Dset may be previously determined and stored at a recording medium.

TABLE 2

| | | | Capacity of dry unit | |
|---|---|---|---|---|
| Segment | Operation termination time Tf | Dry level Dset | The number of operation heater | Capacity of heat pump (bn-1 > bn, n = 1, 2, 3 . . .) |
| 1 | T10 ≤ Tf < T11 | 70% ≤ Dset < 80% | n-2 | b2 |
| | | 80% ≤ Dset < 90% | n-1 | b1 |
| | | 90% ≤ Dset < 100% | n | 100 |
| 2 | T11 ≤ Tf < T12 | 70% ≤ Dset < 80% | n-3 | b3 |
| | | 80% ≤ Dset < 90% | n-2 | b2 |
| | | 90% ≤ Dset < 100% | n-1 | b1 |
| . . . | . . . | . . . | . . . | . . . |
| n | Tn ≤ Tf < Tn + 1 | 70% ≤ Dset < 80% | 1 | bn-2 |
| | | 80% ≤ Dset < 90% | 2 | bn-1 |
| | | 90% ≤ Dset < 100% | 3 | bn |

As shown in Table 2, even within the same segment to which the operation termination time Tf belongs, the number of heaters 240 to be operated according to a dry level Dset again input through the second input unit 212 may be changed. That is, the second controller 220 may again change the number of heaters corresponding to each segment according to a dry level Dset, and in some implementations, as the dry level Dset increases, the number of heaters 240 to be operated is more largely set.

FIG. 4 illustrates an example configuration of a washing and drying system.

Referring to FIG. 4, the washing machine 100 and the dryer 200 may include a first communication unit 160 and a second communication unit 260, respectively, connected by a predetermined network to communicate. The network may be a wire or wireless network.

The first controller 120 transmits an operation termination time Tf of the washing machine to the network through the first communication unit 160, and the operation termination time Tf transmitted in this way is received through the second communication unit 260. The second controller 220 may set a capacity of the dry unit 270 according to the operation termination time Tf received through the second communication unit 260.

Particularly, when the first communication unit 160 and the second communication unit 260 communicate through a wireless network, even if the washing machine 100 and the dryer 200 each are disposed at separated rooms, the operation termination time Tf may be notified, and thus in order for the user locating at a room in which the dryer 200 is disposed to determine the operation termination time Tf of the washing machine 100, it is unnecessary for the user to go to a room in which the washing machine 100 is disposed and thus user convenience is provided.

FIG. 5 illustrates an example configuration of a washing and drying system.

Referring to FIG. 5, the input unit 212 provided in the dryer 200 may include an input means that receives an input of a simultaneous termination instruction from a user. In some implementations, when a simultaneous termination instruction is input through the input unit 212, the controller 220 sets a capacity of the dry unit 270 according to an operation termination time Tf received through the communication unit 260. That is, only when a simultaneous termination instruction is input through the input unit 212, a capacity of the dry unit 270 is adjusted to simultaneously terminate the dryer 200 and the washing machine 100.

FIG. 6 illustrates an example method of controlling a washing and drying system.

Referring to FIG. 6, a method of controlling a washing and drying system includes step (S11) of notifying the dryer 200 of an operation termination time Tf of the washing machine 100, step (S12) of setting a capacity of the dry unit 270 that increases a temperature within a dry chamber of the dryer 200 into which clothing is injected according to the operation termination time Tf notified to the dryer 200, and step (S13) of operating the dry unit 270 according to a capacity set at step S12. A method of setting a capacity of the dry unit 270 according to the operation termination time Tf may be similar to the methods described above.

As the dry unit 270 operates according to a capacity set at step S12, while clothing is dried, the detection unit 230 may continue to detect a dry level D of clothing (S14). The second controller 220 determines whether a dry level D detected by the detection unit 230 arrives at a predetermined reference value Dset (S15). If a dry level D detected by the detection unit 230 arrives at a predetermined reference value Dset, the second controller 220 may terminate operation of the dry unit 270 (S17), and if a dry level D does not arrive at a predetermined reference value Dset, the dry unit 270 may continue to operate (S13). Such a process may be continued until an operation time T of the dry unit 270 arrives at an operation termination time Tf (S16). Here, the reference value Dset may be a value in which the user inputs through the second input unit 212.

The second controller 220 may change the number of operating heaters 240 according to a trend in which a dry level D detected by the detection unit 230 approaches a reference value Dset. For example, if the dry level D increases more rapidly than a predetermined rising slope, the second controller 220 may reduce the number of the operation heater 240, and if the dry level D increases more smoothly than a predetermined rising slope, the second controller 220 may increase the number of the operation heater 240.

The invention claimed is:

1. A method of controlling a laundry processing system comprising a washing machine that has a washing function, and a dryer that has a drying function and that is configured to receive clothing, the method comprising:
   providing, by the washing machine and to the dryer, an operation termination time of the washing machine;
   based on the operation termination time of the washing machine, setting a capacity of a drying unit that is configured to increase a temperature within a drying chamber of the dryer; and
   operating the drying unit according to the set capacity,
   wherein the drying unit comprises one or more heaters,
   wherein setting the capacity of the drying unit comprises setting a number of the one or more heaters to operate according to the operation termination time of the washing machine, and
   wherein operating the drying unit comprises operating the number of the one or more heaters.

2. The method of claim 1, wherein setting the capacity of the drying unit comprises setting the capacity of the drying unit to a value that is inversely related to the operations termination time of the washing machine.

3. The method of claim 2, wherein the drying unit comprises a plurality of heaters.

4. The method of claim 3, comprising:
   storing the number of the plurality of heaters to operate, each number of the plurality of heaters corresponding to a respective range of operation termination times,
   wherein setting the number of the plurality of heaters to operate comprises identifying the respective range of operation termination times to which the operation termination time belongs.

5. The method of claim 2, wherein the drying unit further comprises a heat pump that is configured to increase a temperature within the drying chamber, and
   wherein setting a capacity of the drying unit comprises setting a capacity of the heat pump according to the operation termination time.

6. The method of claim 1, wherein providing an operation termination time of the washing machine comprises:
   transmitting, by the washing machine and through a wired or wireless network, the operation termination time; and
   receiving, by the dryer and through the wired or wireless network, the operation termination time.

7. The method of claim 1, comprising:
   detecting an amount of clothing received; and
   operating a number of heaters based on the amount of clothing received.

8. The method of claim 1, comprising:
   detecting a drying rate of the clothing; and
   reducing a number of heaters operating based on the drying rate satisfying a threshold rate.

9. The method of claim 1, comprising:
   detecting a drying rate of the clothing; and
   increasing a number of heaters operating based on the drying rate not satisfying a threshold rate.

10. A washing and drying system comprising:
    a washing machine that has a washing function; and a dryer that has a drying function and that comprises:
- a drying unit that is configured to increase a temperature within a drying chamber that is configured to receive clothing; and
- a controller that is configured to:
  - set a capacity of the drying unit according to an operation termination time of the washing machine based on operation of the washing machine to be terminated, and
  - operate the drying unit according to the set capacity,
- wherein the drying unit comprises one or more heaters,
- wherein the controller is further configured to:
  - set a number of the one or more heaters to operate according to the operation termination time of the washing machine, and operate the set number of the one or more heaters.

11. The washing and drying system of claim 10, wherein the controller is configured to set the capacity of the drying unit set to a value that is inversely related to the operation termination time of the washing machine.

12. The washing and drying system of claim 10, wherein the drying unit comprises a plurality of heaters.

13. The washing and drying system of claim 12, wherein the dryer further comprises a recording medium that is configured to store the number of the plurality of heaters to operate, each number of the plurality of heaters corresponding to a respective range of operation termination times,
  wherein setting the number of the plurality of heaters to operate comprises identifying the respective range of operation termination times to which the operation termination time belongs.

14. The washing and drying system of claim 11, wherein the drying unit comprises a heat pump that is configured to increase a temperature within the drying chamber,
  wherein the controller is further configured to set a capacity of the heat pump according to the operation termination time.

15. The washing and drying system of claim 10, wherein the washing machine comprises a first communication unit that is configured to transmit, to a wired or wireless network, the operation termination time,
  wherein the dryer further comprises a second communication unit that is configured to receive, through the wired or wireless network, the operation termination time, and
  wherein the controller is configured to set a number of heaters to operate according to the operation termination time.

16. The washing and drying system of claim 10, wherein the drying unit is further configured to detect an amount of clothing received,
  wherein the controller is configured to determine a number of heaters to operate based on the amount of clothing received.

17. The washing and drying system of claim 10, wherein the dryer further comprises a detection unit that is configured to detect a drying rate of the clothing,
  wherein the detection unit reduces a number of heaters operating based on the drying rate satisfying a threshold rate.

18. The washing and drying system of claim 10, wherein the dryer further comprises a detection unit that is configured to detect a drying rate of the clothing,
  wherein the detection unit increases a number of heaters operating based on the drying rate not satisfying a threshold rate.

19. The washing and drying system of claim 1, wherein the controller is configured to set the washing machine and the dryer to have a same operation start time and a same operation termination time.

20. The washing and drying system of claim 1, wherein the dryer operates with a small capacity to increase the operation termination time of the dryer, and simultaneously terminate operation of the dryer with operation of the washing machine.

* * * * *